(12) United States Patent
Zhao et al.

(10) Patent No.: US 8,903,756 B2
(45) Date of Patent: Dec. 2, 2014

(54) SYSTEM AND METHOD FOR KNOWLEDGE PATTERN SEARCH FROM NETWORKED AGENTS

(76) Inventors: Ying Zhao, Cupertino, CA (US); Charles C. Zhou, Cupertino, CA (US)

( * ) Notice: Subject to any disclaimer, the term of this patent is extended or adjusted under 35 U.S.C. 154(b) by 471 days.

(21) Appl. No.: 13/283,442

(22) Filed: Oct. 27, 2011

(65) Prior Publication Data

US 2012/0041901 A1     Feb. 16, 2012

Related U.S. Application Data

(63) Continuation-in-part of application No. 11/875,754, filed on Oct. 19, 2007, now abandoned.

(51) Int. Cl.
*G06F 17/00*     (2006.01)
*G06N 5/04*     (2006.01)

(52) U.S. Cl.
CPC .................................. *G06N 5/043* (2013.01)
USPC .......................................................... 706/55

(58) Field of Classification Search
None
See application file for complete search history.

(56) References Cited

U.S. PATENT DOCUMENTS

| | | | |
|---|---|---|---|
| 6,904,423 B1 * | 6/2005 | Nicolaou et al. | 706/46 |
| 7,747,624 B2 * | 6/2010 | Campos et al. | 707/737 |
| 2005/0102259 A1 * | 5/2005 | Kapur | 707/1 |
| 2007/0226198 A1 * | 9/2007 | Kapur | 707/3 |
| 2007/0250468 A1 * | 10/2007 | Pieper | 707/1 |
| 2008/0097948 A1 * | 4/2008 | Funge et al. | 706/47 |
| 2008/0168052 A1 * | 7/2008 | Ott et al. | 707/5 |
| 2008/0234976 A1 * | 9/2008 | Wittkowski | 702/179 |

* cited by examiner

*Primary Examiner* — Jeffrey A Gaffin
*Assistant Examiner* — David H Kim
(74) *Attorney, Agent, or Firm* — Invent Capture, LLC.; Samuel S. Cho

(57) ABSTRACT

One or more systems and methods for knowledge pattern search from networked agents are disclosed in various embodiments of the invention. A system and a related method can utilizes a knowledge pattern discovery process, which involves analyzing historical data, contextualizing, conceptualizing, clustering, and modeling of data to pattern and discover information of interest. This process may involve constructing a pattern-identifying model using a computer system by applying a context-concept-cluster (CCC) data analysis method, and visualizing that information using a computer system interface. In one embodiment of the invention, once the pattern-identifying model is constructed, the real-time data can be gathered using multiple learning agent devices, and then analyzed by the pattern-identifying model to identify various patterns for gains analysis and derivation of an anomalousness score. This system can be useful for knowledge discovery applications in various industries, including business, competitive intelligence, and academic research.

10 Claims, 13 Drawing Sheets

Knowledge pattern discovery process

500

A single agent process in a knowledge gathering network

100

The data gathering process using a defined schema

200

Import engine with adapters for diversified data sources to a XML warehouse.

300

Transformation engine transforms data in a XML warehouse.

400

Knowledge pattern discovery process

500

Apply knowledge patterns for detection, monitoring and prediction

EQ. 601: Concept Projection of $$\tau = \frac{\sum All\ CC\ in\ \tau}{\sqrt{\#\ of\ unique\ context\ in\ \tau}}$$

EQ. 603: Gaussian distance to Cluster $$l = \frac{e^{-\frac{1}{2}\|Concept\ Projection\ of\ \tau(m\ x1) - Average\ SC(m,1)\|}}{\sum_i e^{-\frac{1}{2}\|Concept\ Projection\ of\ \tau(m\ x1) - Average\ SC(m,1)\|}}$$

Components in A Knowledge Visualizer

700

Link to other agents to form a search network

800

A collaborative search return results from a search network.

Interactions and relations between parts.

1000

Components and their interactions in a Knowledge Gathering Network

1100

Context and Element Relation (EC Matrix)

| | Context $n$ $(n=1,...K)$ |
|---|---|
| Element $W_k$ $(k=1,2,...,K)$ | EC=Association between $W_k$ and Context $n$ |

1201

Probability: $P(W_k|n) = \dfrac{\text{\# of instances when } W_k \text{ follows (or precedes) } n}{\text{\# of instances of } n}$ Lift: $L(W_k, n) = \dfrac{P(W_k|n)}{P(W_k)}$ Difference: $D(W_k, n) = P(W_k|n) - P(W_k)$ Correlation: $R(W_k, n) = \dfrac{\sum_{t=1}^{T}(\text{\# } W_k \text{ in } t)\cdot(\text{\# of } n \text{ in } t)}{\sqrt{\sum_{t=1}^{T}(\text{\# of } W_k \text{ in } t)^2} \cdot \sqrt{\sum_{t=1}^{T}(\text{\# of } n \text{ in } t)^2}}$

1202

Context and Concept Relation (CC matrix)

| | Context $n$ $(n=1,2,...,N)$ |
|---|---|
| Concept $m$ $(m=1,2,...,M)$ | CC=Average EC of the elements belonging to Concept $m$ |

Concept and Sequence Relation (SC Matrix)

| | Concept m (m=1,2,...,M) |
|---|---|
| Sequence t (t=1,2,...,T) | $SC = \dfrac{\sum All\, CC\, in\, t}{\sqrt{\#\, of\, unique\, context\, in\, t}}$ |

1301

Concept and Cluster Relation

| | Concept m (m=1,2,...,M) |
|---|---|
| Cluster (l=1,2,...,L) | Average SC for the sequences belong to Cluster l |

A CCC Model

| Key | Value |
|---|---|
| *Context n Concept m* | *CC(n, m)* |
| ... | ... |
| *Concept m Cluster l* | *Average SC (m, l)* |
| ... | ... |
| *Num of Contexts* | *N* |
| *Num of Concepts* | *M* |
| *Num of Clusters* | *L* |

SYSTEM AND METHOD FOR KNOWLEDGE PATTERN SEARCH FROM NETWORKED AGENTS

BACKGROUND OF THE INVENTION

The present invention relates to new and critical information discovery, processing, and analysis. In particular, various embodiments of the present invention relate to a system and a method for knowledge pattern search from networked agents, wherein the knowledge pattern search is associated with a pattern-identifying analysis model construction and application and real-time data analysis. Furthermore, various embodiments of the present invention are also related to constructing knowledge patterns identified through data mining and text mining, supervised or unsupervised machine learning, and pattern recognition methods.

One of the disadvantages of using conventional search engines for a computer-networked environment (e.g. data network such as the Internet, intranets, LAN's, and etc.) is that they typically sort documents based on the popularity of documents among linked or relevant documents. The conventional popularity-based relevance ranking in conventional search engines for a computer-networked environment is often based on the assumption of linked documents or databases (e.g. Google's PageRank algorithm is largely based on how many in-coming links a page has), and not based on semantics among the documents or databases. Therefore, it may not satisfy search needs or relevance among pieces of information, if the links among the documents or databases are not available. For example, documents in a typical enterprise among different business categories, which are not cross-linked like in the world wide web, may not show up in search results together coherently, even if there are pieces of information in the contents (e.g. semantics) of the documents which render them to be mutually relevant.

Machine-based understanding of semantics and extracting meaning from the semantics among pieces of information to discover events, patterns, and trends can be a challenging task, which is currently only performed in small scales for a small amount of information. At best, there are a number of extant tools for data and text mining in the advanced search engines such as keyword analysis and tagging. These conventional search engines may employ search assistant and language tools, but only offer suggestions of keywords as a user types a certain term into a search engine. However, these conventional keyword analysis and tagging are unable to provide pattern identifications or predictive capabilities to a user.

Furthermore, there is increasing need to share data mining results and search indexes across multiple organizations and businesses that require analysis of open-source data, which may comprise uncertain, conflicting, partial, and unverified data. Organizations and businesses increasingly comprise culturally and geographically-diverse partners with rapidly changing team members and various organizational structures. Because real-time information present in computer networks, including structured data from databases and unstructured data such as text, is enormous and often distributed among millions of computers around the world, a method to collect relevant data to a centralized location has been devised (e.g. a web crawler), but these methods are generally expensive to implement and maintain.

Therefore, the conventional search engine business is generally expensive to operate and maintain, because computer systems associated with the conventional search engine has to copy and store all the data locally before it can index them. In order to respond to this challenge, more powerful information analysis tools which can quickly extract meaning and intent from an origin of data may be beneficial. It may be even more beneficial, if the data mining results or indexes can be accessed across a data network without leaving local computers, or other origins of localized data.

Because a popular piece information is not usually new or unique, the conventional method of searching information in a computer-networked environment may not be useful for certain types of information discovery applications in which a user seeks new, unique, and/or interesting information which may be not popular or well-known by other users. Searching for new, unique, and/or interesting information regardless of their popularity may enable more accurate predictions for early warnings systems for data anomaly detection, competitive intelligence, and business analysis. Furthermore, utilizing localized data mining results or search indexes in each learning agent (e.g. a local computer, an electronic device connected to a local computer, and etc.) to produce collaborate search returns without moving large amounts of data among different learning agents may also be beneficial.

Therefore, a novel system and a related method, which can discover useful information patterns and data anomalies based on semantical analysis and collaborative search returns of various pieces of disjointed yet new and unique information from multiple information sources (i.e. "learning agents"), may be highly beneficial for users in the field of data anomaly detection, competitive intelligence, and business analysis.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a system for knowledge pattern search and analysis from multiple learning agents is disclosed. This system comprises: a learning agent configured to process historical data with a contextualization module, a conceptualization module, and a cluster profile module, wherein at least a portion of the historical data is grouped and categorized by a context-concept-cluster (CCC) data analysis method; the contextualization module configured to utilize a user-defined context for identifying information containing the user-defined context in the historical data, wherein the user-defined context is a condition, a keyword, an element, or a desired target information defined by the user; the conceptualization module configured to group elements and contexts together as a concept based on a calculation of a proximity of relationship between elements and contexts (EC matrix); the cluster profile module containing one or more clusters, wherein each cluster stores a portion of grouped and categorized historical data based on the user-defined context in the contextualization module and the calculation of the proximity of relationship between elements and contexts in the conceptualization module; a pattern-identifying model as a lookup table comprising keys and values, wherein each key contains a keyword related to contexts, concepts, and clusters, and wherein each value contains one or more relationship calculations between elements and contexts (EC matrix), contexts and concepts (CC matrix), concepts and sequences (SC matrix), or averages of SC matrix per cluster; and a CPU and a memory unit operatively connected to the system, wherein the CPU and the memory unit are configured to operate and execute the learning agent, the contextualization module, the conceptualization module, and the cluster profile module to construct and operate the pattern-identifying model based on information stored in the one or more clusters.

In another embodiment of the invention, a system for knowledge pattern search and analysis from multiple learning agents is also disclosed. This system comprises: a learning agent configured to process historical data with a contextualization module, a conceptualization module, and a cluster profile module, wherein at least a portion of the historical data is grouped and categorized by a context-concept-cluster (CCC) data analysis method; the contextualization module configured to utilize a user-defined context for identifying information containing the user-defined context in the historical data, wherein the user-defined context is a condition, a keyword, an element, or a desired target information defined by the user; the conceptualization module configured to group elements and contexts together as a concept based on a calculation of a proximity of relationship between elements and contexts (EC matrix); the cluster profile module containing one or more clusters, wherein each cluster stores a portion of grouped and categorized historical data based on the user-defined context in the contextualization module and the calculation of the proximity of relationship between elements and contexts in the conceptualization module; a pattern-identifying model incorporating Gaussian distance relationships among sequences, clusters, contexts, and concepts; and a CPU and a memory unit operatively connected to the system, wherein the CPU and the memory unit are configured to operate and execute the learning agent, the contextualization module, the conceptualization module, and the cluster profile module to construct and operate the pattern-identifying model based on information stored in the one or more clusters.

In another embodiment of the invention, a method for applying a pattern-identifying model to real-time data for knowledge pattern search and analysis from multiple learning agents is disclosed. This method comprises the steps of: receiving the real-time data in a system for knowledge pattern search and analysis; comparing the real-time data against the pattern-identifying model constructed from a context-concept-cluster (CCC) data analysis method using historical data, wherein the pattern-identifying model contains a lookup table with keys representing keywords of contexts, concepts, and/or clusters, and values representing relationship calculations between elements and contexts (EC matrix), contexts and concepts (CC matrix), concepts and sequences (SC matrix), or averages of SC matrix per cluster; identifying similarity patterns and prediction patterns based on the comparison between the real-time data and the lookup table of the pattern-identifying model; deriving an anomalousness score based on a concept projection calculation and/or a Gaussian distance to cluster calculation; performing a gains analysis by comparing prediction patterns with actual results; and displaying or visualizing the anomalousness score, the gains analysis, and/or other analysis on a display screen to inform a user some unusual, valuable, or anomalous information.

BRIEF DESCRIPTION OF DRAWINGS

FIG. 12 shows a method of an EC matrix (element-and-context relation), which may be quantified with a "probability" calculation, a "lift" calculation, a "difference" calculation, and a "correlation" calculation, in accordance with an embodiment of the invention.

FIG. 12 also shows a method of a CC matrix (context-and-concept relation), in accordance with an embodiment of the invention.

FIG. 13 shows a method of a SC matrix (concept-and-sequence relation), in accordance with an embodiment of the invention.

FIG. 13 also shows an example of a concept-and-cluster relation, in accordance with an embodiment of the invention.

FIG. 14 shows a context-concept-cluster (CCC) matrix, in accordance with an embodiment of the invention.

DETAILED DESCRIPTION

Figure 1:
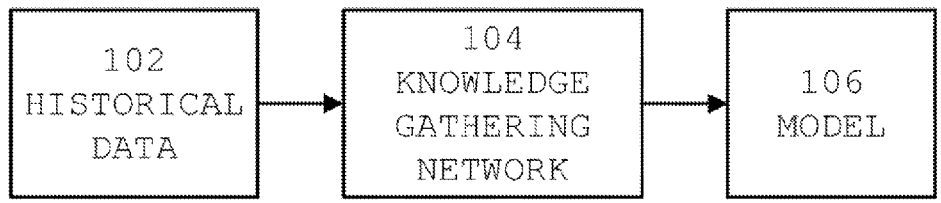
FIG. 1 shows a single learning agent process in a knowledge-gathering computerized data network, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more systems and methods for knowledge pattern search, processing, analysis, and visualization from networked agents. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "domain" is defined as one particular environment or one particular knowledge dimension for data monitoring and gathering. For example, one domain may be associated with velocity monitoring of motorboats on a lake, while another domain may be associated with search term monitoring on an Internet search engine. A "singular domain" refers to one specific environment for data monitoring and gathering. In contrast, "multiple domains" refer to a plurality of environments which may be subject to data monitoring and gathering.

Furthermore, for the purpose of describing the invention, a "domain-specific" or "domain-dependent" analysis refers to analyzing data using specific data profiles represented in one particular domain. In addition, for the purpose of describing the invention, a "cross-domain" analysis refers to analyzing data using data profiles (e.g. normal data profiles, anomalous data, and etc.) represented in multiple domains. For example, a fusion rule in one embodiment of the present invention may involve cross-domain analysis datasets or outputs from multiple domains for deriving a multiple-domain anomalousness score.

In addition, for the purpose of describing the invention, a "domain-independent" analysis refers to using generic criteria which do not take specific conditions of domains into account for data analysis. For example, a fusion rule in one embodiment of the present invention may be blind to specific conditions of each domain in deriving an anomalousness score from multiple domains by using domain-independent fusion rules. For instance, a fused (i.e. multiple-domain) average anomalousness score calculated from numerous anomalousness scores from multiple domains may be considered a domain-independent analysis.

Furthermore, for the purpose of describing the invention, a term "normal data profile" is defined as a dataset, a discovery of patterns, and/or a discovery of groupings or clusters, which do not deviate substantially from a majority of data points, patterns, groupings, or clusters. In a preferred embodiment of the invention, the majority of data points, patterns, groupings, or clusters is considered to be typical or "normal" in a domain to constitute a normal data profile. For example, a dataset which is clustered around a median value or an average value from all data points may constitute a "normal data profile." In another example, a pattern or a grouping may simply be defined as typical or normal in a domain by a manually-specified rule. In a preferred embodiment of the invention, a normal data profile for a particular domain can be dynamically created after undergoing a certain amount of data collection, because an anomaly detection system can determine the majority of data points vs. deviated data points based on collected data. Therefore, in the preferred embodiment of the invention, a normal data profile is dynamically constructed and is not manually pre-defined prior to data collection in a domain.

In addition, for the purpose of describing the invention, terms "anomaly," or "anomalous data" are defined as one or more data points which substantially deviate from a normal data profile. For example, a data point which falls substantially outside of the ranges of standard deviation may be considered an anomaly or anomalous data. An anomaly or anomalous data does not necessarily indicate that this is malicious or harmful data. Rather, the anomaly or the anomalous data may be considered information of unusual characteristics or information of interest.

Furthermore, for the purpose of describing the invention, a term "element" is defined as a symbol or a word, and a term "sequence" is defined as a set of ordered elements.

Moreover, for the purpose of describing the invention, a term "contextualization" is defined as using a user-defined context (e.g. a condition, a keyword, an element, or a desired target information) to identify certain information which contains these contexts. For example, if the user-defined context is finding information with top 500 most-frequently occurring words in business news, then textual information with these 500 most-frequently occurring words may be identified by a system for the knowledge pattern search in accordance with an embodiment of the present invention. This process of finding information based on the user-defined context is called "contextualization."

Furthermore, for the purpose of describing the invention, a term "conceptualization" is defined as grouping information (e.g. elements) together based on an EC (element-and-context) matrix and a CC (context-and-concept) matrix. In one embodiment of the invention, conceptualization may be particularly useful if certain information falls outside of the user-defined context and needs to be grouped with other elements and contexts. For example, if words "stock," "biggest," and "changes" are within the user-defined context, but a word "volatility" is outside of the user-defined context (e.g. not one of the 500 most-frequently occurring words), then a process of conceptualization may involve discovering which words or textual data are most closely associated with the word "volatility." In a preferred embodiment of the invention, the EC matrix and CC matrix calculation approach enables the system for the knowledge pattern search to group unfamiliar (e.g. outside the range of user-defined context, or anomalous data) information together with other information which are determined to be closely associated with this unfamiliar information, thus to reveal the meaning and significance of the unfamiliar information. In the preferred embodiment of the invention, the process of associating an unfamiliar piece of information with other information based on element-and-context (EC) and context-and-concept (CC) relational calculations is called "conceptualization."

In addition, the purpose of describing the invention, a term "clustering" is defined as grouping and storing information into a plurality of clusters, each of which is based on proximity or "closeness" of information determined by contextualization and conceptualization processes. For example, a list of elements may be produced as an output of contextualization, and a list of concepts may be produced as an output of conceptualization. In this example, if the list of elements and the list of concepts have a close semantic proximity based on a probability calculation, a lift calculation, a difference calculation, a correlation calculation, an EC matrix, a CC matrix, and/or a standard deviation among elements, contexts, concepts, and sequences, then this list of elements and the list of concepts may be categorized and stored in the same cluster.

In addition, for the purpose of describing the invention, a term "generic learning procedure" is defined as an intelligent procedure capable of deriving one or more rules from conditions, patterns, data collection, historical data, and other sources of information. In a preferred embodiment of the invention, a generic learning procedure may be used in a learning agent, a mining engine, and/or a normal data profile construction for data analysis and rule creations.

Furthermore, for the purpose of describing the invention, a term "agent" is defined as a data collection or a monitoring mechanism in a domain. For example a learning "agent" in a first domain may be a speed sensor for moving boats in a lake. In another example, a learning "agent" in a second domain may be a script program associated with a search engine for monitoring search terms into the search engine. In a preferred embodiment of the invention, a learning agent may be configured to collect, consider, and/or incorporate more than one source or one dimension of information. For example, a learning agent can develop a simple or complicated rule based on a generic learning procedure from historical or collected data. An example of a rule developed by a learning agent may be something like "when the lake is under a high amount of traffic, a motorboat slows down," based on the collected data of boat speeds in the lake, historical data, or other source of information available to the learning agent.

One aspect of an embodiment of the present invention is disclosing a computerized system for knowledge pattern search and analysis from a plurality of networked learning agents. In one embodiment of the invention, this computerized system can conduct a context-concept-cluster (CCC) data analysis on historical data to construct a pattern-identifying model, which can then be used to identify patterns, data anomalies, and data characteristics of interest from real-time data. Based on the pattern-identifying model comparison against the real-time data, this computerized system may also generate anomalousness scores and gains analysis results for the real-time data.

Another aspect of an embodiment of the present invention is disclosing a method for knowledge pattern search and analysis from a plurality of networked agents, wherein the method utilizes a computerized system for its procedures.

Yet another aspect of an embodiment of the present invention is disclosing various approaches to quantify relational proximities between elements and contexts (EC matrix), contexts and concepts (CC matrix), concepts and sequences (SC matrix), or any other parameters identified in a context-concept-cluster (CCC) data analysis, wherein the quantified relational proximities can be further utilized as part of a pattern-identifying model to identify patterns, data anomalies, and data characteristics of interest from real-time data FIG. 1 shows a single learning agent process (100) in a knowledge-gathering computerized data network, in accordance with an embodiment of the invention. In a preferred embodiment of the invention, a single learning agent may be a standalone computer system with a database storage, a CPU, and a memory unit, wherein the standalone computer system may be operatively connected to a computerized data network, such as the Internet and/or LAN. In another embodiment of the invention, a single learning agent may be a portable computing device (e.g. a smart mobile phone, a tablet computer) or an electronic sensor operatively connected to a computing device.

In case of the preferred embodiment of the invention, the standalone computer system may have stored historical data (102) in its database storage, or receive at least a portion of the historical data (102) from the computerized data network. Then, in the preferred embodiment of the invention, this historical data (102) may be at least partially processed in its CPU and memory unit, in association with a knowledge gathering network (104) for parsing of the data.

The information processing in association with the knowledge gathering network (104) may be performed in a distributed manner among multiple learning agents (e.g. processing tasks localized, individualized, divided, and/or distributed in each "learning agent"), which may help efficient processing of large amount of information for knowledge pattern search and processing. In the preferred embodiment of the invention, the information processing in association with the knowledge gathering network (104) involves contextualization, conceptualization, clustering, and/or other information processing and categorization to derive a pattern-identifying model (e.g. 106 of FIG. 1, 512 of FIG. 5).

Figure 2:
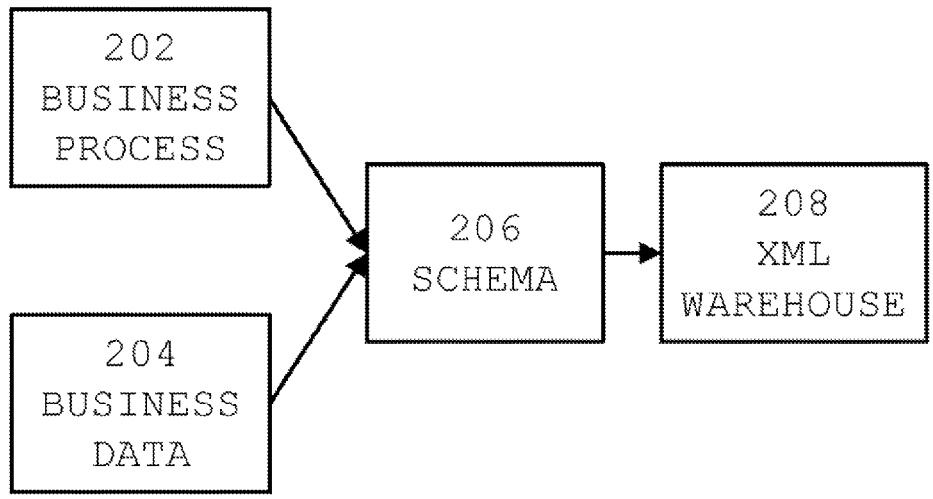
FIG. 2 shows an example of a data-gathering process using a defined schema associated with a computerized data network, in accordance with an embodiment of the invention.

FIG. 2 shows an example of a data-gathering process (200) using a defined schema associated with a computerized data network, in accordance with an embodiment of the invention. FIG. 2 merely shows an example of using certain real-time or historical data, which are business-related information (202, 204), and a particular data categorization plan called a "schema" (206) to store the real-time or historical information (202, 204) in a data storage, such as an XML warehouse (208). In another example not shown in FIG. 2, the real-time or historical data may be related to competitive intelligence, computer security issues, national security issues, or any other real-time or historical information worthy of detailed data analysis. While the XML warehouse (208) is shown in FIG. 2 as an example, various embodiments of the present invention are not merely limited to the XML architecture, and are configured to utilize any types of desirable data formats and database architecture.

Figure 3:
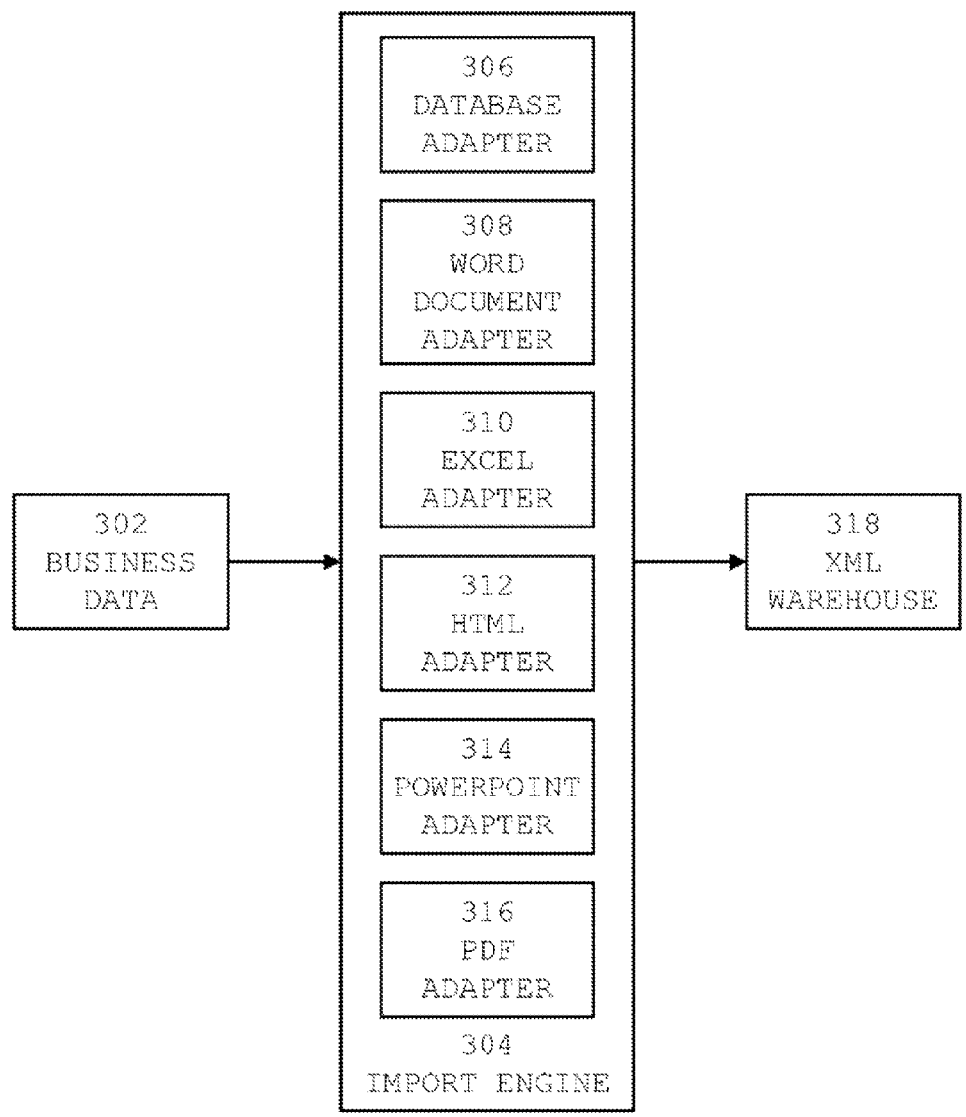
FIG. 3. shows an example of an import engine with a plurality of adapters for processing diverse data sources to an XML warehouse associated with a computerized data network, in accordance with an embodiment of the invention.

FIG. 3. shows an example (300) of an import engine (304) with a plurality of adapters (306, 308, 310, 312, 314, 316) for processing diverse data sources to an XML warehouse associated with a computerized data network, in accordance with an embodiment of the invention. In this example, real-time or historical information is business data (302), which is fed into the import engine (304) comprising a database adapter (306), a word document adapter (308), an spreadsheet (e.g. Excel) adapter (310), an HTML adapter (312), a presentation file (e.g. PowerPoint) adapter (314), and a PDF adapter (316). These adapters (306, 308, 310, 312, 314, 316) are typically software modules, which are configured to be executed on a CPU and a memory unit of a computer system.

In a preferred embodiment of the invention, a computer system executing a various adapter software modules may be a single learning agent among a plurality of learning agents, which work together as a system for knowledge pattern search and analysis, wherein each learning agent (e.g. a computer system, a portable electronic device, a sensor device, and etc.) is capable of processing real-time or historical information (e.g. business data (302)) local to or allocated to each learning agent.

In the example shown in FIG. 3, the business data (302) can be processed by the import engine (304), which may standardize various data formats and digitized information to a standard data format, such as the XML format. Then, in this particular example, the standardized format can be stored in an information storage, such as the XML warehouse (318). In another embodiment of the invention, the types of adapters used in the import engine (304) may be customized for different data formats, and an information storage may be for something other than the XML format.

Figure 4:
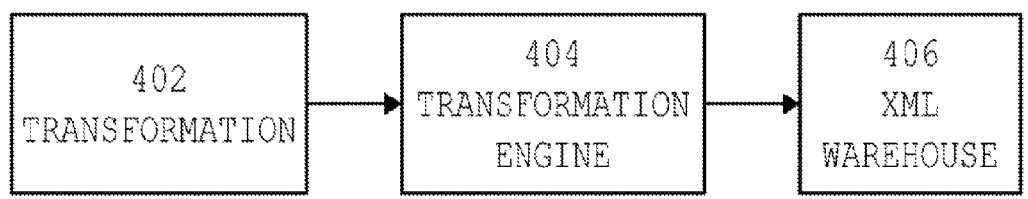
FIG. 4 shows a transformation engine configured to transform data in an XML warehouse associated with a computerized data network, in accordance with an embodiment of the invention.

FIG. 4 shows an example (400) of a transformation engine (404) configured to transform data in an XML warehouse (406) associated with a computerized data network, in accordance with an embodiment of the invention.

In one embodiment of the invention, transformation tools (402) in the transformation engine (404) built from XSLT are used for loading data into an XML warehouse (406) according to the schema (206 of FIG. 2). In case of numeric data, transformation tools (402) can be used to change the numeric data into symbols.

Figure 5:
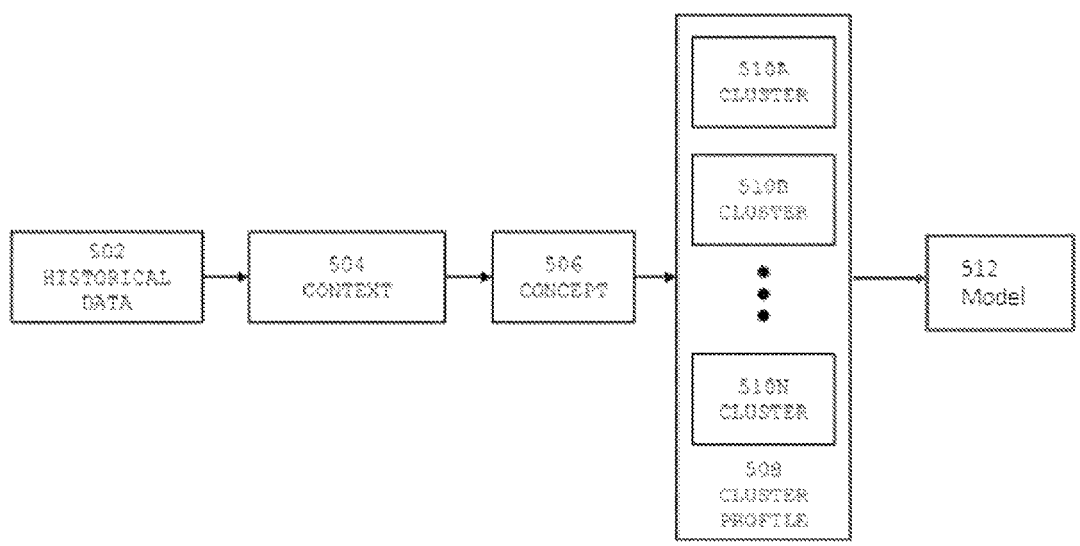
FIG. 5 shows a knowledge pattern discovery process to construct a pattern-identifying model, wherein the knowledge pattern discovery involves contextualization, conceptualization, and clustering of historical data for a computerized data network, in accordance with an embodiment of the invention.

FIG. 5 shows a knowledge pattern discovery process (500) to construct a pattern-identifying model (512), wherein the knowledge pattern discovery involves contextualization (504), conceptualization (506), and clustering (508, 510A~510N) of historical data (502) for a computerized data network, in accordance with an embodiment of the invention. In a preferred embodiment of the invention, the knowledge pattern discovery process is a data processing and analysis procedure configured to be executed on a CPU and a memory unit of one or more learning agents (e.g. computer systems, portable electronic devices, sensor devices, and etc.).

Figure 6:
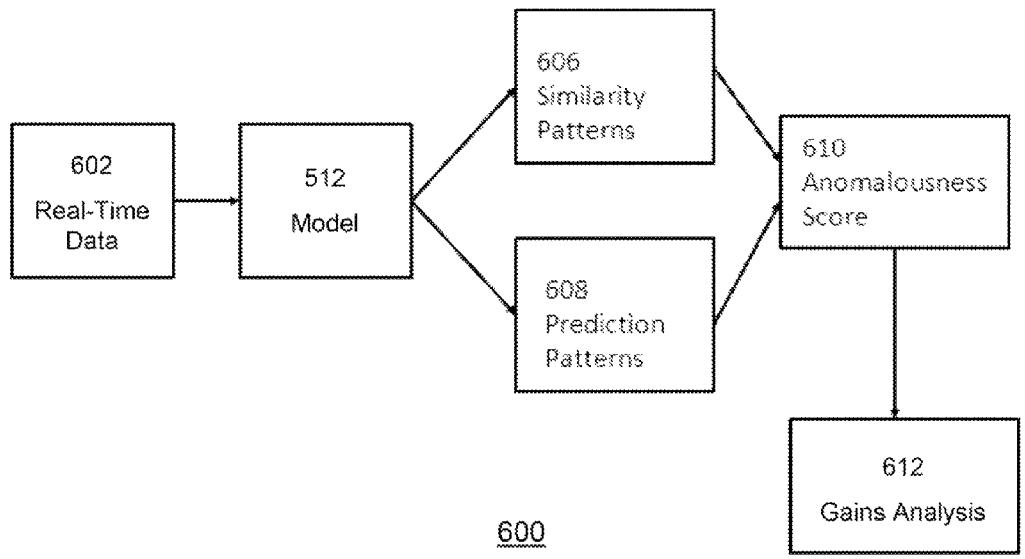
FIG. 6 shows an exemplary method of applying a constructed pattern-identifying model to real-time data associated with a computerized data network for data pattern analysis, calculation of a data anomalousness score, and/or a gains analysis, in accordance with an embodiment of the invention.

In the preferred embodiment of the invention, the knowledge pattern discovery process as shown in FIG. 5 involves analyzing at least some historical data (502) using a context-concept-cluster (CCC) data analysis method to construct a pattern-identifying model (512), which can then be used for real-time data pattern detection, monitoring, and prediction (e.g. FIG. 6).

As shown in FIG. 5, in the preferred embodiment of the invention, the historical data (502), which may be a collection of textual data, multimedia data, or any other data accumulated by one or more computer systems, is first processed by a contextualization module (504). In one or more embodiments of the invention, "contextualization" of input historical data (e.g. 502) utilizes a user-defined context (e.g. a condition, a keyword, or a desired target information) to identify certain information which contains these contexts. For example, if the user-defined context is finding information with top 500 most-frequently occurring words in business news, then textual information with these 500 most-frequently occurring words may be identified by the contextualization module (504).

Then, for some pieces of information which are not readily identified for certain useful patterns (e.g. as defined by a user) in the contextualization module (504), a conceptualization module (506) can be utilized to group information together based on an EC (element-and-context) matrix and a CC (context-and-concept) matrix. For a preferred embodiment of the invention, the EC matrix is shown in 1201 of FIG. 12, as and four equations for probability, lift, difference, and correlation calculations are shown in 1202 of FIG. 12. Furthermore, for the preferred embodiment of the invention, the CC matrix is shown in 1203 of FIG. 12.

In a preferred embodiment of the invention as shown in FIG. 5, 1202 of FIGS. 12, and 1203 of FIG. 12, the EC matrix and CC matrix calculation approach enables the system for the knowledge pattern search to group unfamiliar (e.g. outside the range of user-defined context) information together with other information, which are determined to be closely associated with this unfamiliar information. In one embodiment of the invention, the conceptualization module (506) may be particularly useful if certain information falls outside of the user-defined context and needs to be grouped with other elements and contexts. For example, if words "stock," "biggest," and "changes" are within the user-defined context, but a word "volatility" is outside of the user-defined context (e.g. not one of the 500 most-frequently occurring words), then a process of conceptualization may involve discovering which words or textual data are most closely associated with the word "volatility."

Continuing with FIG. 5, in a preferred embodiment of the invention, a cluster profile module (508) comprises one or more clusters (i.e. 510A, 510B, . . . , 510N), wherein each cluster stores grouped, categorized, and/or sorted information based on proximity or "closeness" of information discovered or determined by contextualization and conceptualization processes. For example, a list of elements may be produced as an output of contextualization, and a list of concepts may be produced as an output of conceptualization. In this example, if the list of elements and the list of concepts have a close semantic proximity based on a probability calculation, a lift calculation, a difference calculation, a correlation calculation, an EC matrix, a CC matrix, and/or a standard deviation among elements, contexts, and concepts, some of which are shown in FIGS. 12-14, then this list of elements and the list of concepts may be categorized and stored in the same cluster.

For one or more embodiments of the invention, the methods of defining and relating several aspects of data contents among each other are shown in FIGS. 12-14. In various embodiments of the invention, elements, contexts, concepts, sequences, and clusters are important aspects of data contents for semantic analysis, which can be defined as mathematical concepts. For example, element 1201 in FIG. 12 shows an example of an EC matrix (element-and-context relation), which may be quantified with a "probability" calculation, a "lift" calculation, a "difference" calculation, and a "correlation" calculation, in accordance with an embodiment of the invention. In one embodiment of the invention, an EC value may represent a proximity of association between an element (Wk) and a context (n), wherein the EC value may be quantified by one or more of the calculations related to probability, lift, difference, and correlation.

Furthermore, element 1203 of FIG. 12 shows an example of a CC matrix (context-and-concept relation) in accordance with an embodiment of the invention, wherein a CC value may represent an average EC value of the elements belonging to a concept (m). Therefore, a high CC value may indicate an overall coherence of association between elements and contexts for a particular concept (m), and a low CC value may indicate an overall looseness/incoherence of association between elements and contexts for the particular concept (m).

Moreover, element 1301 in FIG. 13 shows an example of a SC matrix (concept-and-sequence relation), in accordance with an embodiment of the invention. A high SC value may indicate "closeness" or coherence of a concept (m) to a sequence (t), and a low SC value may indicate "looseness" or incoherence of the concept (m) to the sequence (t). In addition, element 1302 in FIG. 13 shows an example of a concept-and-cluster relation, in accordance with an embodiment of the invention. A concept-and-cluster relation value represents an average of SC (concept-and-sequence relation) values for a particular cluster (l). Therefore a high concept-and-cluster relation value may indicate a general "closeness" or coherence of concepts and sequences per cluster, while a low concept-and-cluster relation value may indicate a general "looseness" or incoherence of concepts and sequences per cluster. Furthermore, element 1401 in FIG. 14 shows a context-concept-cluster (CCC) matrix, in accordance with an embodiment of the invention.

FIG. 6 shows an example (600) of applying a constructed pattern-identifying model (512) to real-time data (602) associated with a computerized data network for data pattern analysis (i.e. by using 606 and 608), calculation of a data anomalousness score (i.e. 610), and/or a gains analysis (i.e. 612), in accordance with an embodiment of the invention. In one embodiment of the invention, the data anomalousness score may be computed in an anomalousness score module (610) based on outputs of the pattern-identifying model (512) and data patterns (i.e. 606, 608). In one embodiment of the invention, a high data anomalousness score indicates a high likelihood of data anomaly, and a low data anomalousness score indicates a low likelihood of data anomaly. In a preferred embodiment of the invention, the pattern-identifying model (512) for data sets of interest (e.g. 502 of FIG. 5) is formulated by a knowledge pattern discovery process (500 of FIG. 5), which generally involves a context-concept-cluster (CCC) data analysis method as described for FIG. 5.

Once the pattern-identifying model (512) is constructed, this model can be applied to the real-time data (602) to discover and identify similarity patterns (606) and prediction patterns (608). In one or more embodiment of the invention, the similarity patterns (606) can be identified by group and cluster characteristics measured by user-defined context, keywords, and/or the context-concept-cluster (CCC) data analysis method, as shown in FIG. 5 and FIGS. 12~14. The prediction patterns (608) can be discovered from the historical data by correlating a desired description for prediction (e.g. price increase of a stock) with the keywords describing information stored in a particular cluster (a cluster in the cluster profile (508)). Then, concept projection (EQ. 601) and/or Gaussian distance to a cluster (EQ. 603) may be calculated to derive an anomalousness score (610).

In a preferred embodiment of the invention, the anomalousness score (610) derived from real-time information favors a smaller cluster because the anomalousness score (610) can be calculated as the Gaussian distance divided by the size of a cluster, which is associated with the number of sequences in the cluster. Information in a smaller cluster may also suggest, though not necessarily so, relatively unique information contained in the cluster. Furthermore, a gains analysis (612) may be performed to sort the real-time data (602) according to the derived anomalousness scores (610). The gains analysis (612) may indicate usefulness or worthiness of a particular set of the real-time data (602).

Figure 7:
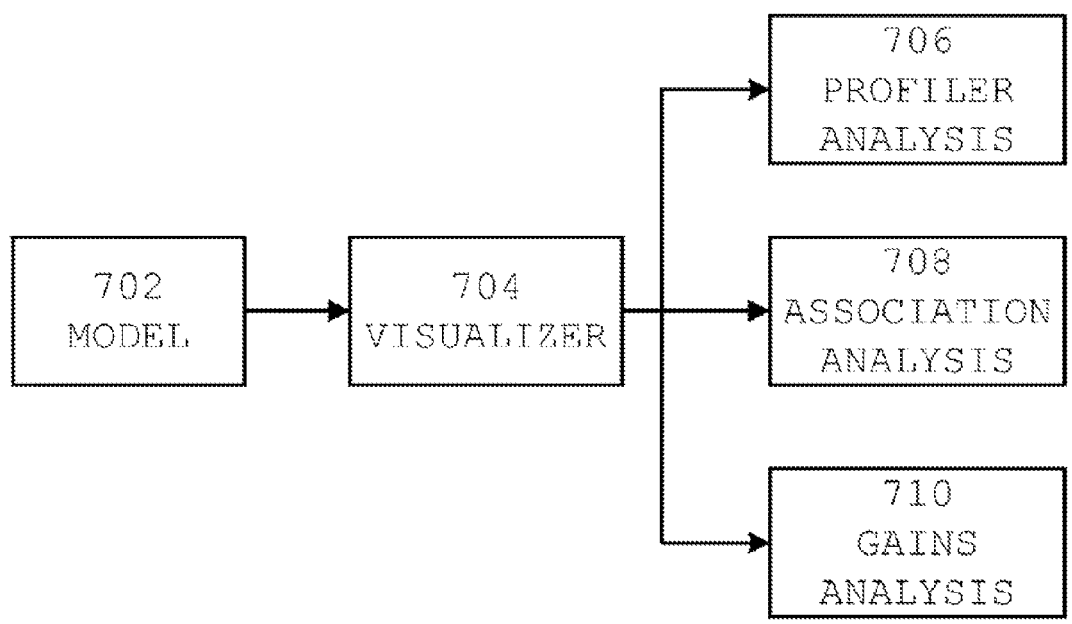
FIG. 7 shows a plurality of components in a knowledge visualization module associated with a computerized data network, in accordance with an embodiment of the invention.

FIG. 7 shows a plurality of components (700) in a knowledge visualization module (704) associated with a computerized data network, in accordance with an embodiment of the invention. In a preferred embodiment of the invention, outputs from a pattern-identifying model (702) can be fed into the knowledge visualization module (704), which may assist displaying of information related to data or analytical information, such as information from a profiler analysis module (706), an association analysis module (708), and a gains analysis module (710). In the preferred embodiment of the invention, the knowledge visualization module (704) is configured to send visualization data to a graphics chip in a computer system or another component in a system for knowledge pattern search, so that the graphics chip can transmit display information to a computer monitor or another visual display.

Figure 8:
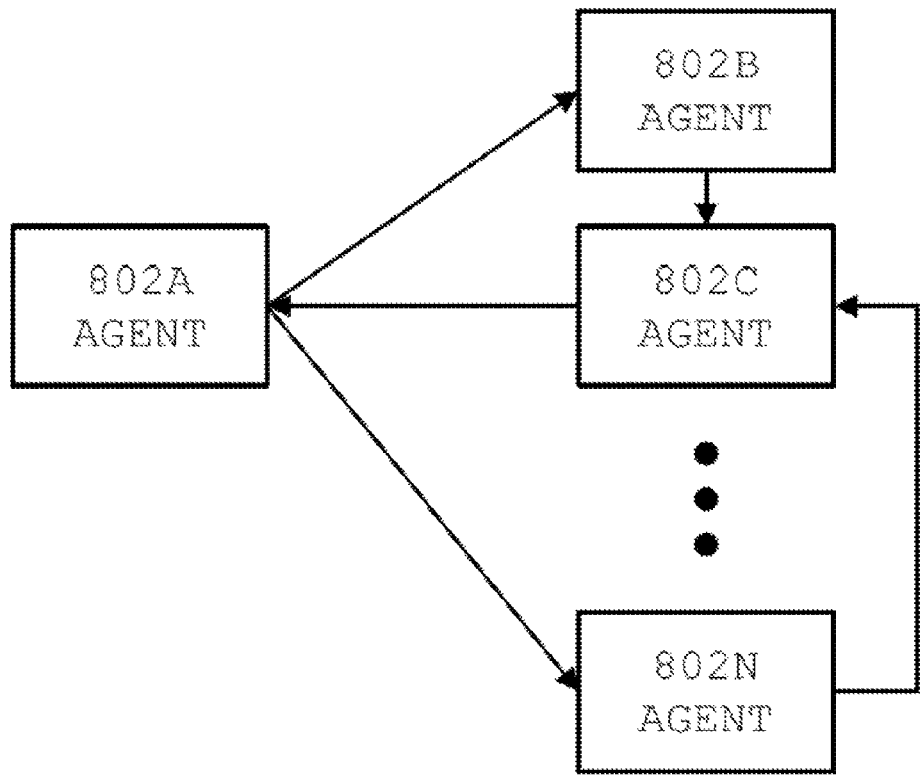
FIG. 8 shows a general collaborate search concept involving a multiple number of learning agents associated with a computerized data network, in accordance with an embodiment of the invention.

FIG. 8 shows a general collaborate search concept (800) involving a multiple number of learning agents (802A, 802B, 802C, . . . , 802N) associated with a computerized data network, in accordance with an embodiment of the invention. In a preferred embodiment of the invention, each learning agent may be a computer system, a portable electronics device, a sensor system, or another system capable of processing computerized data with a CPU, a memory unit, and/or a data storage unit.

Furthermore, in the preferred embodiment of the invention, each learning agent may contain its own pattern-identifying model based on its own knowledge pattern discovery process (e.g. FIG. 5) and clustering of contextualized and conceptualized historical data. Yet in another embodiment of the invention, the plurality of learning agents may share a single pattern-identifying model or share a multiple number of pattern-identifying models, so that each learning agent does not necessarily have to process its own knowledge pattern discovery process, including contextualization, conceptualization, and clustering of historical data for every learning agent.

A plurality of these learning agents may be operatively connected together via data networks to work collaboratively as a distributed system or a cooperative system. The multiple learning agent configuration as shown in FIG. 8 may reduce the burden of data processing, transmission, and analysis time by utilizing a distributed system or a cooperative system which comprises a multiple number of learning agents, compared to a centralized architecture in which all relevant data is transmitted to a particular system for data processing and analysis.

Figure 9:
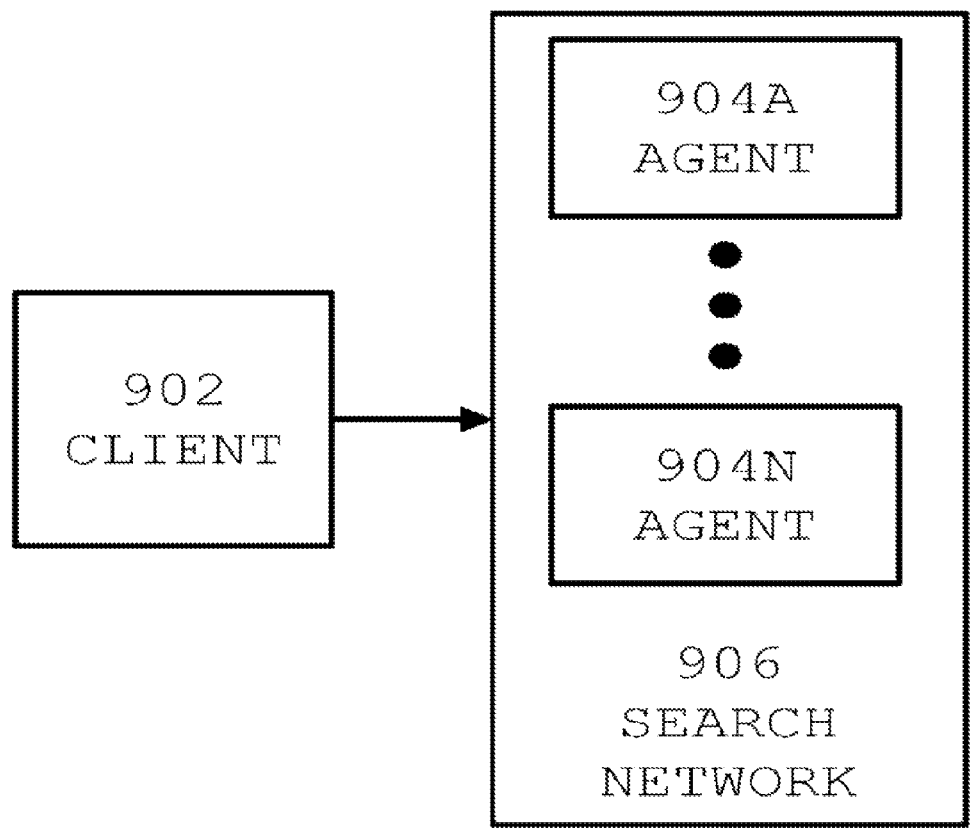
FIG. 9 shows a diagram showing a collaborative search return results from a computerized data network with the multiple number of learning agents, in accordance with an embodiment of the invention.

FIG. 9 shows a diagram (900) showing a collaborative search return results from a multiple number of learning agents (904A, . . . , 904N) comprising a search network (906), in accordance with an embodiment of the invention. As shown in FIG. 9, a user or a client (902) is able to access search results provided by the search network (906), which comprises a multiple number of learning agents (904A, . . . , 904N).

Figure 10:
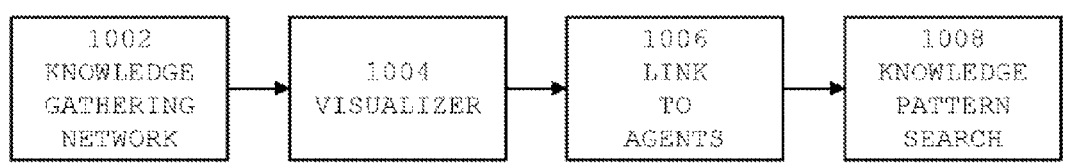
FIG. 10 shows an interaction diagram among different modules in a collaborative search return environment involving a multiple number of learning agents, in accordance with an embodiment of the invention.

FIG. 10 shows an interaction diagram (1000) among different modules in a collaborative search return environment involving a multiple number of learning agents, in accordance with an embodiment of the invention. In one embodiment of the invention, a knowledge-gathering network (1002) is operatively connected to a visualization module (1004). This visualization module (1004) may be operatively connected to a plurality of learning agents (1006), which are capable of performing a knowledge pattern search and analysis (1008).

Figure 11:
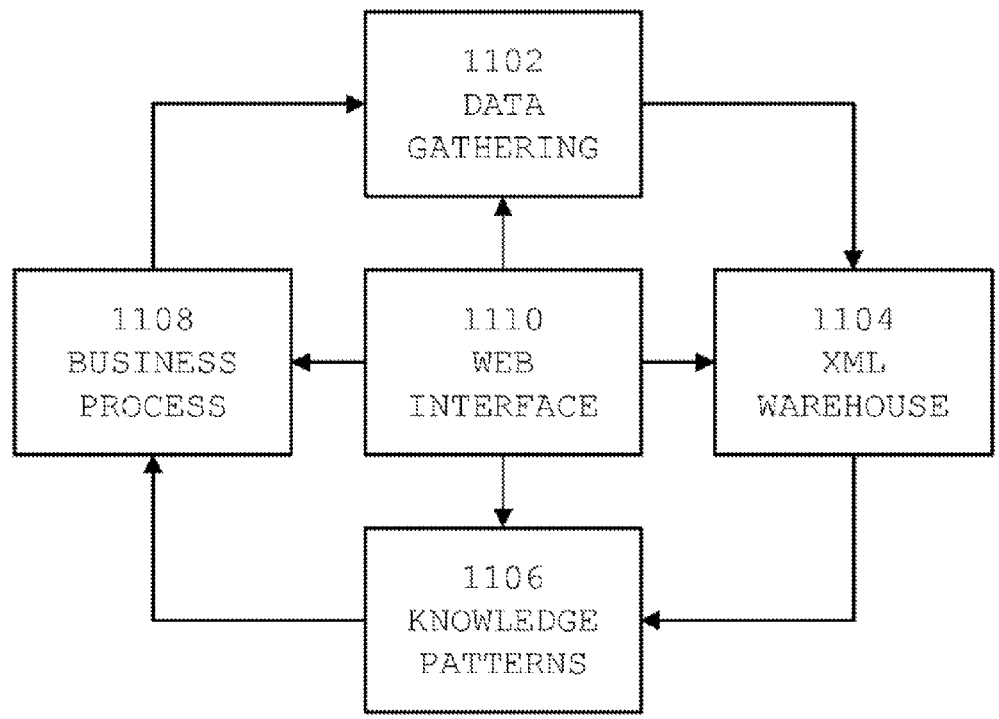
FIG. 11 shows a plurality of components and their mutual interactions in a knowledge-gathering computerized data network, in accordance with an embodiment of the invention.

FIG. 11 shows a plurality of components and their mutual interactions in a knowledge-gathering computerized data network, in accordance with an embodiment of the invention. In a preferred embodiment of the invention, a web interface (1110) for a user is operatively connected to a data-gathering module (1102), a knowledge patterns module (1106), and an XML warehouse module (1104). These modules may be software programs operating and executed on a CPU and a memory unit of a computer system, a learning agent, or another electronic device. In the preferred embodiment of the invention, the data-gathering module (1102) may comprise components identical or similar to elements described in FIG. 6. The knowledge pattern module (1106), on the other hand, may include components identical or similar to elements described in FIG. 5. The XML warehouse module (1102) is typically a data storage or a database storage operatively connected to a computer system or another electronic device. In one example, the real-time data (e.g. 602 of FIG. 6) and the historical data (e.g. 502 of FIG. 5) may be related to business process-related data (1108).

To demonstrate a practical example of using the context-concept-cluster (CCC) data analysis method as shown in FIG. 5 to construct a pattern-identifying model (512), and also to demonstrate an application of this pattern-identifying model (512) to real-time data (602) for pattern identification and analysis as shown in FIG. 6, an example using business news as historical data (e.g. 502 of FIG. 5) and real-time data (602 of FIG. 6) is described below:

In this particular example, new, unique, and information of interest refers to "profitable" news for a public company. The financial market may be assumed to be price efficient, suggesting that it can quickly incorporate new information of a company into its stock price in real-time. A piece of new information related to a company may impact its stock price in lightning speed, sometimes even before it reaches the general public (e.g. due to an insider's leak, or pre-market trading). However, in this example, we assume that there are some news which may disseminate slow enough to provide predictive and profitable opportunities.

1. Historical Data (502 of FIG. 5)

Business and financial market data are used in this example, wherein the data are publicly available as follows:
   a) Structured data: Financial performance indicators (e.g. stock prices) of 4000 public companies
   b) Unstructured data: daily business news for these companies
   c) News and financial indicators older than a short period of time (e.g. older than a few minutes of real-time data stream).

In this example, the data are periodically mined and separated into patterns and data anomalies, hence enabling an early detection of business intelligence and profit opportunities. For example, the business and financial news of previous 24 hours or another time duration can be categorized into n characteristics groups using the context-concept-cluster algorithm (CCC) shown in FIG. 5.

In this example, the CCC algorithm is used to parse the historical data (e.g. 24 hours news for 4000 companies). The steps of the CCC algorithm are described below in three steps. For this example, each sentence, paragraph, or article can be set as a "sequence," and a word in a sentence is set as an "element" for the following process below:

Step 1 (e.g. 504 of FIG. 5):
   Assuming a sequence t with $W_k$ (k=1, 2, . . . , K), this example selects a set of Context n (n=1, 2, . . . , K), which is a subset of the elements in t, where their occurrences are larger than other elements outside the context set. Then, as shown in element 1201 in FIG. 12 in the drawings, a system executing the knowledge pattern discovery process (e.g. 500 of FIG. 5, wherein the system may be a computer system, a portable electronic device, a sensor device, a learning agent, and etc.) can compute the association between each "element," $W_k$, with "Context," n.
   This example uses four methods of computing the element-and-context relation (EC) as shown in element 1201 of FIG. 12.
   In element 1201 of FIG. 12, t represents a sequence, such as a sentence; $W_k$ stands for an element, such as a word in a sentence; n stands for context, such as an element next to $W_k$.

Step 2 (e.g. 506 of FIG. 5):
   Continuing with the example followed from Step 1, "concepts" are generated and labeled as Concept, m, (m=1, 2, . . . , M) by clustering all elements $W_k$ based on the EC matrix in element 1201 in FIG. 12. For each cluster, the system executing the knowledge pattern discovery process (e.g. 500 of FIG. 5) can compute the average association between an element and a context as a context-and-concept relation denoted as CC in element 1203 of FIG. 12.

Step 3 (e.g. 508 of FIG. 5):
   Continuing with the example followed from Step 1 and Step 2 above, the system executing the knowledge pattern discovery process (e.g. 500 of FIG. 5) can project the original sequence of elements into concepts by summing all context-and-concept (CC) relations over the number of contexts in a sequence, t, as shown in element 1301 in FIG. 13.

After this process, each sequence can be represented as a numeric association with a set of concepts, m=1, 2, . . . , M. In this example, the SC matrix shown in element 1301 in FIG. 13 may be used for clustering sequences.

The clustering of contextualized and conceptualized business and financial news data contains a list of average concept-and-sequence relation values per cluster, as shown in element 1302 in FIG. 13. After the clustering of data is complete (e.g. 510A, 510B, . . . , 510N in 508 of FIG. 5), the data processed through this context-concept-cluster (CCC) data analysis method can be placed as key-value lookup table pairs, as shown in element 1401 in FIG. 14. This key-value lookup table pairs, as shown in element 1401 in FIG. 14, may be called a CCC pattern-identifying model (e.g. 512 of FIG. 5 and FIG. 6). It may be desirable to place relational calculations associated with contexts, concepts, and clusters as lookup table values, and keywords derived from contexts and concepts as lookup table keys, as shown in element 1401 in FIG. 14.

2. Real-Time Data (e.g. 602 of FIG. 6)

Continuing with the example of processing of historical data described above, the CCC pattern-identifying model (e.g. 512 of FIG. 5) constructed through the context-concept-cluster (CCC) data analysis method is now ready to be applied to real-time data (e.g. 602 of FIG. 6) to determine and identify various patterns worthy of analysis.

In this example, real-time data can be news and financial indicator changes within certain period of real time (e.g. a few minutes), and they are evaluated for similarity patterns (606) and prediction patterns (608). Each characteristic group or cluster (e.g. 510A, 510B, . . . , 510N in 508 of FIG. 5) described using the keywords (e.g. contexts, concepts and clusters in element 1401 in FIG. 14) associated with values is essentially a similarity pattern. On the other hand, a prediction pattern is discovered from the historical data by linking or correlating particular characteristics, such as the price increase of a stock (i.e. good news), with the keywords describing one or more clusters containing key-value lookup table pairs in the CCC pattern-identifying model (e.g. 512 of FIG. 5 and FIG. 6), which is constructed from the historical news data (e.g. 502 of FIG. 5).

In this example, each piece of new information (i.e. real-time data (602) or a new sequence τ below) may be decomposed into contexts, concepts and clusters and analyzed in the pattern-identifying model (512), which identifies similarity patterns (606) and prediction patterns (608). Then, an anomalousness score (610) may be quantified by applying a CCC model on a new sequence, τ, as shown below:

Score for a new sequence, τ=Gaussian distance of concept projection of τ to Cluster l, where
a Concept Projection of the new sequence, τ, is shown in EQ. 601 of FIG. 6.

Furthermore, a Gaussian distance to Cluster l, is shown in EQ. 603 of FIG. 6.

In this particular example, the Gaussian distance represents the likelihood of the new sequence τ belonging to Cluster l. The anomalousness score (610) is the Gaussian distance divided by the size (e.g. number of sequences or sentences) in Cluster l, which may predict an impact of certain news (e.g. likelihood of a stock price increase).

Following this business news data example, in the gains analysis (612), the real-time data is sorted according to the anomalousness scores. The real-life gains or measures for value, or "worthiness" of the news (e.g. profits made following a recommendation of stock buy based on the news) can be computed along the sorted list.

For example, news of companies related to keywords "profit up", "earnings beat expectation," or "debt" clusters may have immediate impact, because these keywords related to the price changing patterns are already in the public's conscience and awareness. In this case, these popular keywords may belong to one or more clusters characterized by public popularity. The sizes of clusters containing popular keywords or number of news sentences may be relatively large.

As shown by this example, by analyzing historical data (502) to construct a CCC pattern-identifying model (e.g. 512), a user may notice that there are clusters of news which are not immediately understood for their real-life consequences. For instance, a company may publish news stating that it "seeks strategic alternatives" for its future. The user may not immediately understand what this means. However, by processing this piece of business news through the constructed CCC pattern-identifying model (e.g. 512) to identify similarity patterns (606) and prediction patterns (608) as shown in FIG. 6, the user may be able to understand that the company is likely to put itself up for sale, and that the stock price of the company may rise as a result of this news. For this corporate news seeking "strategic alternatives," the dissemination of the meaning of the news may be slow because it may not be obvious that there is correlation between the stock price increase and the keyword, "seeks strategic alternatives".

The correlation is between a stock price increase and certain keywords or information can be presented as a pattern identified from the historical data during the construction of the CCC pattern-identifying model (e.g. 512). It is feasible that in real-life situations of using the system for knowledge pattern search and analysis, the value of certain prediction patterns may change over time. For example, when a prediction pattern gets popular (i.e. being known to many people), the sizes of the clusters associated with this prediction pattern is likely to grow bigger, and an incoming real-time news which fits this increasingly popular pattern may have less impact on stock price increases. Therefore, in some situations, the magnitude of an impact of new piece of data (e.g. a company seeking strategic alternatives) is relative to unusualness, rarity, or anomalousness of the new piece of data. Therefore, in some situations, it may be important to periodically update the CCC pattern-identifying model (e.g. 512) with new pattern correlations (i.e. updates to element 1401 in FIG. 14) to make its semantic analysis more accurate to ever-changing dynamic information contents and data flow in computerized data networks.

3. Multiple Learning Agent System (e.g. FIG. 8)

Continuing with the business news example above, 4000 companies which are monitored in real-time for data analysis can utilize multiple learning agents (e.g. 802A, 802B, 802C, . . . , 802N of FIG. 8). The multiple learning agents can also be installed in multiple computer systems operatively connected to each other. In a preferred embodiment of the invention, the pattern-identifying models in each learning agent are updated periodically (e.g. every 24 hours) and are stored locally in each learning agents' data storage and/or indexes.

The multiple number of learning agents can make a collaborative decision and perform gains analysis to predict profit, loss, stock price increase, stock price decline, and etc. The gains analysis may also help determining the significance/relevance of an incoming piece of news. The significance/relevance can be evaluated against both similarity and prediction patterns in one or more CCC pattern-identifying models (e.g. 512) in the multiple number of learning agents working collaboratively as a distributed system or a cooperative network system.

Furthermore, in another example of implementing an embodiment of the present invention, the system for knowledge pattern search for multiple network learning agents comprises four parts, as shown below:

Part 1: Knowledge Gathering Network

In this example, Part 1 is a knowledge-gathering network which presents a total view of information, knowledge, and objects that are engaged in a business or knowledge management process (202 of FIG. 2). For this example, the knowledge-gathering network is an XML-based knowledge gathering, creation, and dissemination system (104 of FIG. 1, 1002 of FIG. 10) that mines, learns, and discovers knowledge patterns from historical data (102 of FIG. 1). The knowledge patterns are stored as a pattern-identifying model (106 of FIG. 1) locally in a learning agent. In this particular example, the knowledge gathering network contains the following components:

Component 1: Gathers historical data via a data-gathering module (1102 of FIG. 11). At a high level, this component defines how business data (204 of FIG. 2, 302 of FIG. 3, 602 of FIG. 6) is organized and flows into a business or knowledge management process (202 of FIG. 2). An XML data schema or ontology (206 of FIG. 2) describes how concepts are hierarchically organized in the process to store them into an XML Warehouse (208 of FIG. 2).

Component 2: Imports data into an XML Warehouse (1104 of FIG. 11). ETL tools in the import engine (304 of FIG. 3) include adapters for extracting data from a database (306 of FIG. 3), word document (308 of FIG. 3), Excel (310 of FIG. 3), HTML (312 of FIG. 3), PDF (314 of FIG. 3) or PPT (316 of FIG. 3) source. Furthermore, in this example, transformation tools (402 of FIG. 4) in the transformation engine (404 of FIG. 4) built from XSLT are used for loading data into an XML warehouse (208, 318, 406) according to the schema (206 of FIG. 2).

Component 3: This component utilizes the CCC analysis model as shown in FIG. 5 to discover knowledge patterns (1106 of FIG. 11) for construction of a pattern-identifying model. Furthermore, in this example, this component discovers correlations and patterns in the XML warehouse using the context-concept-cluster (CCC) data analysis method. The XML warehouse contains raw observations or inputs for a collection of hierarchical objects as for data mining. Data mining can be applied to the objects at any level of the hierarchy. Their input observations can be text, numeric data, or any form of symbolic languages used to describe characteristics of an object or an element. For numeric data, transformations (402 of FIG. 4) are used to change the numeric data into symbols.

In this example, the context-concept-cluster (CCC) data analysis method is used for information mining. A context (504 of FIG. 5) is a symbol which occurs frequently in a symbolic system. A concept (506 of FIG. 5) is a group of symbols that either appear frequently together or appear frequently together with a same context. Therefore, they are connected by meaning. For this example, an object cluster (510 of FIG. 5) is a characteristic group of objects grouped according to the concepts. The contexts and concepts are discovered automatically. The object cluster profile (508 of FIG. 5) is the foundation of knowledge patterns (604 of FIG. 6).

These knowledge patterns include, for example, similarity patterns and prediction patterns. A similarity pattern (606 of FIG. 6) refers to a group of concepts that are used to describe how objects are similar to each other. A prediction pattern (608 of FIG. 6) establishes a predictive relationship between an earlier analysis of a concept and an actual result observed subsequently to predict likelihood of future events, if an associated concept analyzed earlier occurs.

Component 4: This component utilizes application of a constructed pattern-identifying model (512 of FIG. 5, 512 of FIG. 6) to real-time data (602 of FIG. 6, 1108 of FIG. 11) for analyzing knowledge patterns from the real-time data. For this example, knowledge patterns can be viewed as normal behaviors of the participants in a business or knowledge management process. They are used to contrast, detect, and predict unusual behaviors, anomalies, or new opportunities that might come to the data network dynamically. The pattern-identifying model (512 of FIG. 5, 512 of FIG. 6) is used to monitor and understand real-time news data feed. They can also be used to regulate a business process.

Part 2: Knowledge Pattern Visualization

For this example, a single pattern-identifying model (702 of FIG. 7) from a single agent can be viewed using a visualizer module (704 of FIG. 7). Patterns can be displayed in clusters and concepts, which are sorted according to a chosen metric in a profiler analysis module (706 of FIG. 7). Similarity patterns can be viewed in the profiler analysis module (706 of FIG. 7) and the association analysis module (708 of FIG. 7). The prediction patterns can be viewed in the gains analysis module (710 of FIG. 7).

Part 3: Knowledge Pattern Link

For this example, each learning agent (802A, 802B, 802C, . . . , 802N of FIG. 8) mines, learns, and discovers its own knowledge patterns using its own domain-specific data sets. Then, the learning agent can links to the other learning agents to form a distributed or collaborative search network. For this example, the distributed or collaborative search network may be achieved by implementing a peer-to-peer architecture, and listing other learning agents in each learning agent's peer list.

Part 4: Collaborative Knowledge Pattern Search

For this example, a web client (902 of FIG. 9) can search and find information from a search network (906 of FIG. 9) formed by the learning agents (904A, . . . , 904N of FIG. 9) in the distributed or collaborative search network (906 of FIG. 9). The ranking of search results may be determined by a search content's uniqueness relative to a search context.

Various embodiments of the present invention may provide several advantages over conventional information search engines and systems. For example, by utilizing multiple learning agents to perform context-concept-cluster (CCC) data analysis on historical data per learning agent to construct one or more pattern-identifying models, various embodiments of the present invention can build and update accurate pattern-identifying models with more computing efficiency and less data bandwidth usage than a conventional centralized data processing architecture.

Furthermore, by utilizing quantified relational proximities between elements and contexts (EC matrix), contexts and concepts (CC matrix), concepts and sequences (SC matrix), and/or any other parameters identified in a context-concept-cluster (CCC) data analysis as part of a pattern-identifying model, the knowledge pattern search and analysis as disclosed in various embodiments of the present invention can identify unique, valuable, and critical information from real-time data, and bring them to a user's attention with anomalousness scoring and gains analysis.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for knowledge pattern search and analysis from multiple learning agents, the system comprising:
   a learning agent configured to process historical data with a contextualization module, a conceptualization module, and a cluster profile module, wherein at least a portion of the historical data is grouped and categorized by a context-concept-cluster (CCC) data analysis method;
   the contextualization module first analyzing the historical data as an unsupervised machine-learning process to identify information patterns in the historical data without a user entry of a search term, and then selectively taking in a user-defined context for narrowing of the information patterns found from the unsupervised machine-learning process in the historical data, wherein the user-defined context is a condition, a keyword, an element, or a desired target information defined by the user;
   the conceptualization module configured to group elements and contexts together as a concept based on a calculation of a proximity of relationship between elements and contexts (EC matrix);
   the cluster profile module containing one or more clusters, wherein each cluster stores a portion of grouped and categorized historical data based on the user-defined context in the contextualization module and the calculation of the proximity of relationship between elements and contexts in the conceptualization module;
   a pattern-identifying model as a lookup table comprising keys and values, wherein each key contains a keyword related to contexts, concepts, and clusters, and wherein each value contains one or more relationship calculations between elements and contexts (EC matrix), contexts and concepts (CC matrix), concepts and sequences (SC matrix), or averages of SC matrix per cluster; and
   a CPU and a memory unit operatively connected to the system, wherein the CPU and the memory unit are configured to operate and execute the learning agent, the contextualization module, the conceptualization module, and the cluster profile module to construct and operate the pattern-identifying model based on information stored in the one or more clusters.

2. The system for knowledge pattern search and analysis from multiple learning agents of claim 1, further comprising an anomalousness score module configured to generate a data anomalousness score based on an evaluation of real-time data using the pattern-identifying model.

3. The system for knowledge pattern search and analysis from multiple learning agents of claim 1, further comprising a gains analysis module configured to compare prediction patterns derived from the pattern-identifying model against actual results to indicate accuracy of the prediction patterns.

4. The system for knowledge pattern search and analysis from multiple learning agents of claim 1, further comprising a visualizer module configured to display at least some analytical components of real-time data analysis using the pattern-identifying model, wherein the analytical components include at least one of similarity patterns, predictions patterns, a data anomalousness score, and a gains analysis result.

5. A system for knowledge pattern search and analysis from multiple learning agents, the system comprising:

a learning agent configured to process historical data with a contextualization module, a conceptualization module, and a cluster profile module, wherein at least a portion of the historical data is grouped and categorized by a context-concept-cluster (CCC) data analysis method;

the contextualization module first analyzing the historical data as an unsupervised machine-learning process to identify information patterns in the historical data without a user entry of a search term, and then selectively taking in a user-defined context for narrowing of the information patterns found from the unsupervised machine-learning process in the historical data, wherein the user-defined context is a condition, a keyword, an element, or a desired target information defined by the user;

the conceptualization module configured to group elements and contexts together as a concept based on a calculation of a proximity of relationship between elements and contexts (EC matrix);

the cluster profile module containing one or more clusters, wherein each cluster stores a portion of grouped and categorized historical data based on the user-defined context in the contextualization module and the calculation of the proximity of relationship between elements and contexts in the conceptualization module;

a pattern-identifying model incorporating Gaussian distance relationships among sequences, clusters, contexts, and concepts, wherein the Gaussian distance relationships are calculated for generating sequence scores in real-time data and also for evaluating worthiness of information based on gains analysis; and a CPU and a memory unit operatively connected to the system, wherein the CPU and the memory unit are configured to operate and execute the learning agent, the contextualization module, the conceptualization module, and the cluster profile module to construct and operate the pattern-identifying model based on information stored in the one or more clusters.

6. The system for knowledge pattern search and analysis from multiple learning agents of claim 5, wherein some of the clusters, contexts, and concepts associated with the pattern-identifying model are weighted to have priorities over other clusters, contexts, and/or concepts for real-time data analysis using the pattern-identifying model.

7. The system for knowledge pattern search and analysis from multiple learning agents of claim 5, further comprising an anomalousness score module configured to generate a data anomalousness score based on an evaluation of real-time data using the pattern-identifying model.

8. The system for knowledge pattern search and analysis from multiple learning agents of claim 5, further comprising a gains analysis module configured to compare prediction patterns derived from the pattern-identifying model against actual results to indicate accuracy of the prediction patterns.

9. The system for knowledge pattern search and analysis from multiple learning agents of claim 5, further comprising a visualizer module configured to display at least some analytical components of real-time data analysis using the pattern-identifying model, wherein the analytical components include at least one of similarity patterns, predictions patterns, a data anomalousness score, and a gains analysis result.

10. A method for applying a pattern-identifying model to real-time data for knowledge pattern search and analysis from multiple learning agents, the method comprising the steps of:

receiving the real-time data in a system for knowledge pattern search and analysis;

comparing the real-time data against the pattern-identifying model constructed from a context-concept-cluster (CCC) data analysis method using historical data, wherein the pattern-identifying model contains a lookup table with keys representing keywords of contexts, concepts, and/or clusters, and values representing relationship calculations between elements and contexts (EC matrix), contexts and concepts (CC matrix), concepts and sequences (SC matrix), or averages of SC matrix per cluster;

identifying similarity patterns and prediction patterns based on the comparison between the real-time data and the lookup table of the pattern-identifying model;

deriving an anomalousness score based on a concept projection calculation and a Gaussian distance to cluster calculation, wherein the Gaussian distance to the cluster calculation generates sequence scores in the real-time data and also evaluates worthiness of information with a gains analysis;

performing the gains analysis by comparing prediction patterns with actual results; and displaying or visualizing the anomalousness score, the gains analysis, and/or other analysis on a display screen to inform a user some unusual, valuable, or anomalous information.

* * * * *

UNITED STATES PATENT AND TRADEMARK OFFICE
CERTIFICATE OF CORRECTION

PATENT NO. : 8,903,756 B2
APPLICATION NO. : 13/283442
DATED : December 2, 2014
INVENTOR(S) : Ying Zhao and Charles Chuxin Zhou Page 1 of 1

It is certified that error appears in the above-identified patent and that said Letters Patent is hereby corrected as shown below:

In the Specification

Column 1, line 4, insert

--This invention was made with Government support under N00024-05-C-4120 awarded by Naval Sea Systems Command, and under, and W911NF-07-C-0039 awarded by US Army RDECOM ACQ CTR W911NF. The Government has certain rights in this invention.--

Signed and Sealed this
Twenty-first Day of July, 2015

Michelle K. Lee
*Director of the United States Patent and Trademark Office*